United States Patent [19]

Padilla et al.

[11] Patent Number: 4,819,135
[45] Date of Patent: Apr. 4, 1989

[54] BICYCLE LIGHTING DEVICE

[76] Inventors: Edward Padilla, 6931 Iselta Blvd., SW., Albuquerque, N. Mex. 87105; Herman Martinez, P.O. Box 12754, Albuquerque, N. Mex. 87195

[21] Appl. No.: 168,922

[22] Filed: Mar. 16, 1988

[51] Int. Cl.$^4$ ............................................... B60Q 1/00
[52] U.S. Cl. ..................................... 362/72; 362/252; 362/396; 340/432
[58] Field of Search ................. 362/72, 800, 252, 249, 362/250, 234, 396, 227, 806; 340/134; 26/28

[56] References Cited

U.S. PATENT DOCUMENTS

| | | | |
|---|---|---|---|
| 2,416,160 | 2/1947 | Davidson | 362/72 |
| 2,469,944 | 5/1949 | Bauters | 362/72 |
| 3,525,088 | 4/1970 | Thummel | 362/72 |
| 3,987,409 | 10/1976 | Freeman | 362/72 |
| 4,148,096 | 4/1979 | Haas et al. | 362/800 |
| 4,173,035 | 10/1979 | Hoyt | 362/249 |
| 4,337,503 | 6/1982 | Turner | 362/72 |
| 4,523,258 | 6/1985 | Morre et al. | 362/800 |
| 4,597,033 | 6/1986 | Meggr et al. | 362/62 |
| 4,598,339 | 7/1986 | Ainsworth | 362/72 |
| 4,656,564 | 4/1987 | Felder | 362/72 |

FOREIGN PATENT DOCUMENTS 11384 3/1902 United Kingdom ................. 362/72

Primary Examiner—Ira S. Lazarus
Assistant Examiner—D. M. Cox
Attorney, Agent, or Firm—Jerry T. Kearns

[57] ABSTRACT

A bicycle lighting device includes three pieces of transparent flexible plastic tubing, each provided with two rows of longitudinally spaced light emitting diodes embedded at diametrically opposed locations along the tube. Each piece of tubing is longitudinally slit for insertion around a frame tube of a bicycle. The three tubes are connected by electrical wiring and are also connected to a battery pack which includes a sequencing circuit for flashing the LEDs in sequence. The three tubes are secured in a triangular configuration on the bicycle frame tubes and provide a broadside flashing standard slow moving vehicle signal to motorists.

2 Claims, 3 Drawing Sheets

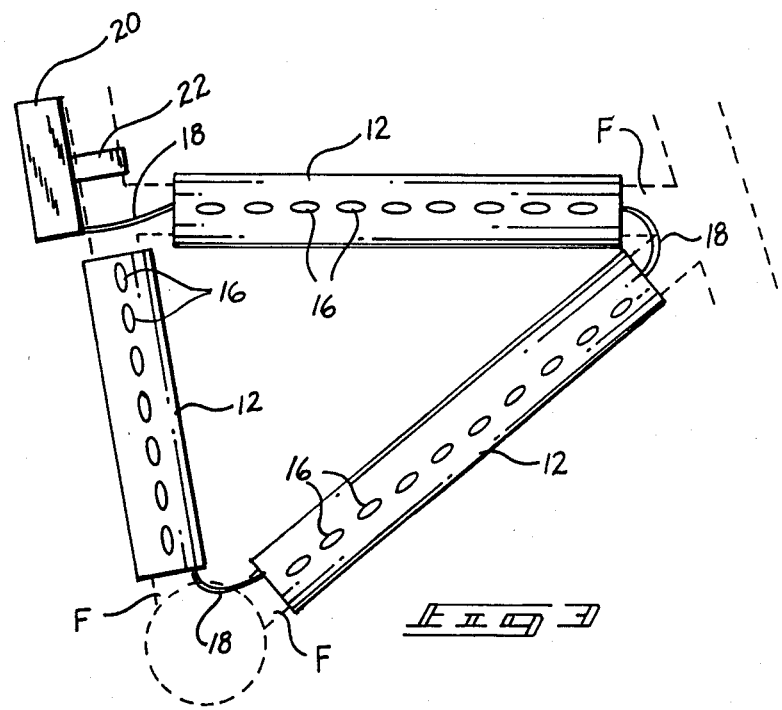
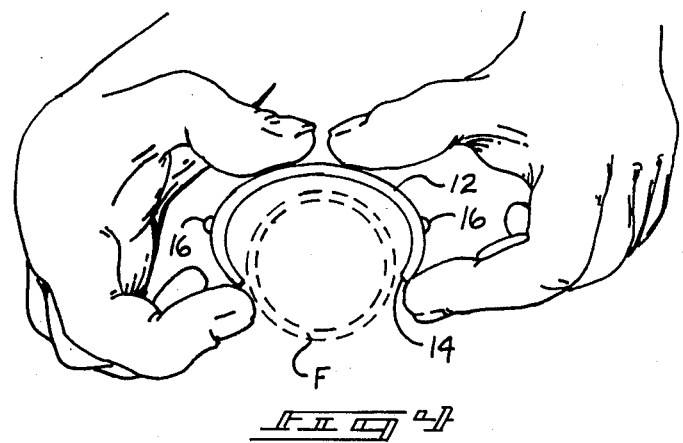

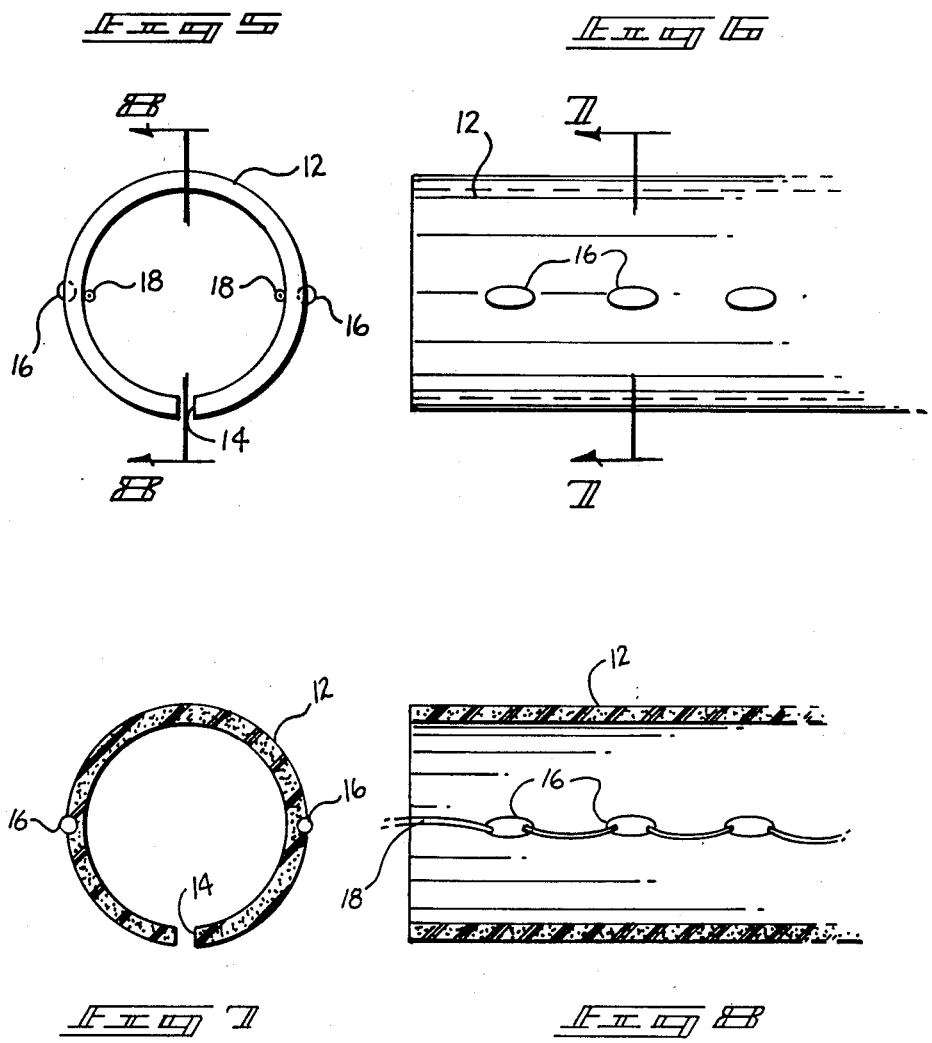

BICYCLE LIGHTING DEVICE

BACKGROUND OF THE INVENTION

1. Field of the Invention

The present invention relates to bicycle lighting devices, and more particularly pertains to a new and improved lighting device which provides enhanced durability and visibility. Currently, motorists find it very difficult to see bicyclists at sunset and at night. Statistics indicate that most accidents involving bicyclists occur at night. Conventional bicycle lights utilize battery powered lights and generator powered lights which typically consist of a single headlight and a single taillight. These conventional bicycle lights provide a limited amount of visibility to motorists coming directly toward a bicycle, but do not provide any sufficient illumination of the bicycle to motorists approaching the bicycle broadside. Additionally, the conventional bicycle lights utilize small electrical light bulbs which are relatively dim and consume large amounts of electrical current. These conventional electrical light bulbs utilize filaments which often fail due to prolonged exposure to the vibration of the bicycle. This necessitates a frequent replacement of the bulb and associated batteries. The present invention solves the aforementioned problems by providing a plurality of transparent flexible tubes adapted to be received on the frame tubes of a bicycle. The lighting device of the present invention provides enhanced durability and greatly increases the broadside visibility of a bicycle to a motorist.

2. Description of the Prior Art

Various types of bicycle lighting devices are known in the prior art. A typical example of such a bicycle lighting device is to be found in U.S. Pat. No. 2,416,160, which issued to T. Davidsson Feb. 18, 1947. This patent discloses a signalling system for bicycles which includes a filament type electric bulb mounted in each hand grip on the handle bar of the bicycle. A switching mechanism is provided to selectively flash one of these lights. U.S. Pat. No. 2,469,944, which issued to J. Bauters on May 10, 1949, discloses a hand grip signaling device for insertion into the ends of a bicycle handle bar. The device utilizes conventional electric filament type bulbs. U.S. Pat. No. 3,525,088, which issued to H. Thummel on Aug. 18, 1970, discloses a bicycle fender formed from a bowed plastic strip having a smooth outer surface. A metal foil, embossed into prismatic projections, is embedded in the plastic strip and forms a reflective surface and is utilized as an electrical conductor in a bicycle lighting system. U.S. Pat. No. 4,598,339, which issued to M. Ainsworth on July 1, 1986, discloses a light wand attachment for bicycles which includes a plurality of lamps longitudinally spaced within a transparent tubular light wand formed from a plastic material. Sequencing circuits are provided for intermittent illumination of the spaced lamps in sequence. U.S. Pat. No. 4,656,564, which issued to W. Felder on Apr. 7, 1987, discloses a bicycle handle bar light which is provided with forwardly extending resilient radially expandable handle bar engaging retaining members in contact with the inside surface of the handle bar and surrounding a light bulb. A transparent cover sheet is supported and extends across the rear of the light bulb in a position when mounted to be aligned close to the rear end of the handle bar. A bulb supporting tube extends from the holder to hold a bulb socket which encloses the base of the bulb.

While the above mentioned devices are suited for their intended usage, none of these devices provide a bicycle lighting device which utilizes three interconnected flexible transparent plastic tubes provided with embedded longitudinally spaced LEDs for enhancing the broad side visibility of a bicycle. Inasmuch as the art is relatively crowded with respect to these various types of bicycle lighting devices, it can be appreciated that there is a continuing need for and interest in improvements to such bicycle lighting devices, and in this respect, the present invention addresses this need and interest.

SUMMARY OF THE INVENTION

In view of the foregoing disadvantages inherent in the known types of bicycle lighting devices now present in the prior art, the present invention provides an improved bicycle lighting device. As such, the general purpose of the present invention, which will be described subsequently in greater detail, is to provide a new and improved bicycle lighting device which has all the advantages of the prior art bicycle lighting devices and none of the disadvantages.

To attain this, a representative embodiment of the concepts of the present invention is illustrated in the drawings and makes use of three pieces of transparent flexible plastic tubing, each provided with a plurality of longitudinally spaced light emitting diodes. Each piece of tubing is longitudinally slit for insertion around a frame tube of a bicycle. The three tubes are connected by electrical wiring and are also connected to a battery pack which includes a sequencing circuit for flashing the LED's in sequence.

There has thus been outlined, rather broadly, the more important features of the invention in order that the detail description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle lighting device which has all the advantages of the prior art bicycle lighting devices and none of the disadvantages.

It is another object of the present invention to provide a new and improved bicycle lighting device which may be easily and efficiently manufactured and marketed.

It is a further object of the present invention to provide a new and improved bicycle lighting device which is of a durable and reliable construction.

An even further object of the present invention is to provide a new and improved bicycle lighting device which is susceptible of a low cost of manufacture with regard to both materials and labor, and which accordingly is then susceptible of low prices of sale to the consuming public, thereby making such bicycle lighting devices economically available to the buying public.

Still yet another object of the present invention is to provide a new and improved bicycle lighting device which provides in the apparatuses and methods of the prior art some of the advantages thereof, while simultaneously overcoming some of the disadvantages normally associated therewith.

Still another object of the present invention is to provide a new and improved bicycle lighting device which provides enhanced broadside visibility of a bicycle to a motorist at night.

Yet another object of the present invention is to provide a new and improved bicycle lighting device which utilizes a plurality of interconnected transparent flexible plastic tubes provided with longitudinally spaced LEDs.

Even still another object of the present invention is to provide a new and improved bicycle lighting device which utilizes a plurality of longitudinally slit interconnected transparent flexible plastic tubes provided with spaced LEDs for engagement around the frame tubes of a bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of a portion of a bicycle frame, illustrating the mounting of the bicycle lighting device according to the present invention.

FIG. 4 is a diagrammatic illustration disclosing the manner of mounting the bicycle lighting device of the present invention around a bicycle frame tube.

FIG. 5 is a front end view of a bicycle lighting device according to the present invention.

FIG. 6 is a side view of a portion of a bicycle lighting device according to the present invention.

FIG. 7 is a transverse cross sectional view, taken along line 7—7 of FIG. 6, illustrating the bicycle lighting device of the present invention.

FIG. 8 is a partial longitudinal cross sectional view, taken along line 8—8 of FIG. 5, illustrating the bicycle lighting device of the present invention.

DESCRIPTION OF THE PREFERRED EMBODIMENT

Figure 1:
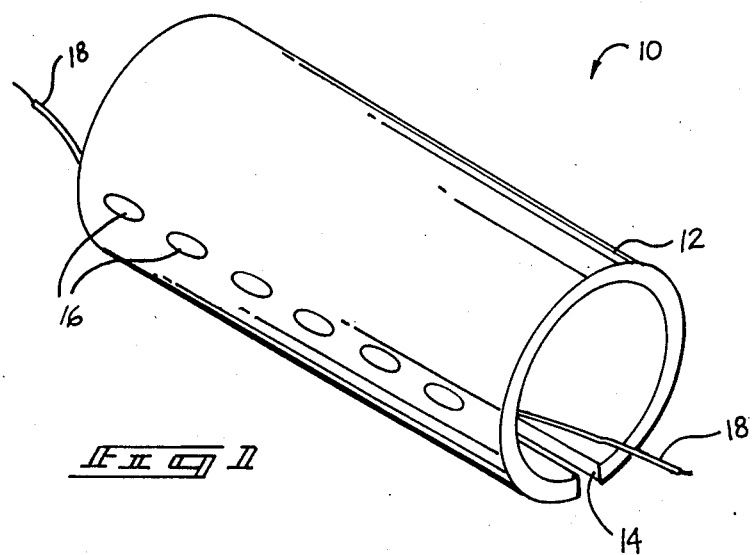
FIG. 1 is a perspective view of a bicycle lighting device according to the present invention.

With reference now to the drawings, and in particular to FIG. 1 thereof, a new and improved bicycle lighting device embodying the principles and concepts of the present invention and generally designated by the reference numeral 10 will be described.

More specifically, it will be noted that the first embodiment 10 of the invention includes an elongated tube 12 formed from a transparent flexible plastic material. The tube 12 is provided with a longitudinally extending slit 14. A plurality of light emitting diodes 16 are longitudinally spaced along the tube 12 and are embedded therein. Due to the extreme durability of these LEDs, they may be encapsulated in the plastic material during the manufacture of the tube 12. This provides a shock resistant mounting for the LEDs and also provides for an inexpensive and efficient manufacture. The LEDs 16 are interconnected by conventional electrical wiring 18 which may also be embedded in the tube 12.

Figure 2:
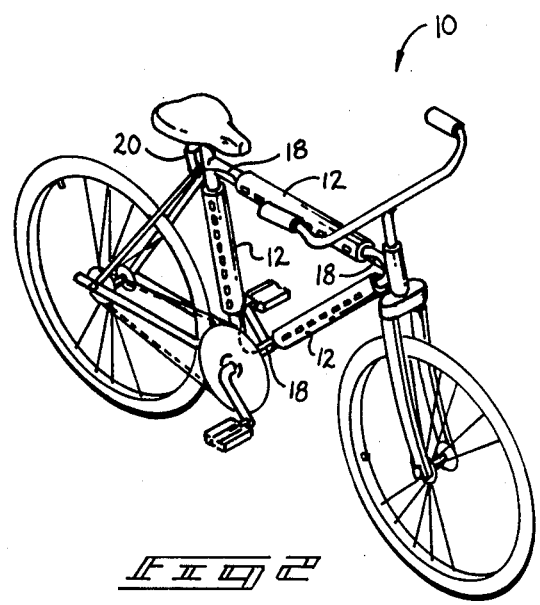
FIG. 2 is a perspective view of a bicycle provided with the bicycle lighting device of the present invention.

With reference now to FIG. 2, it may be seen that three tubes 12 are engaged around the frame tubes of a conventional bicycle. The tubes 12 thus form a generally triangular configuration. This is important, because the triangular configuration is the standard symbol for slow moving vehicles. The spaced LEDs 16 on each of the tubes 12 is connected by electrical wiring 18 to a power source 20. Due to the extremely low power consumption of the LEDs 16, a pair of conventional nine volt batteries are sufficient to provide power for a long period of time. A flashing sequencing circuit is also incorporated in the power supply 20, for intermittently flashing the LEDs 16 on each of the tubes 12 in sequence. This sequencing circuit may be of a conventional type as disclosed in U.S. Pat. No. 4,598,339, the disclosure of which is hereby incorporated herein by reference. It should be noted that the electrical wiring 18 between each of the tubes 12 in the power supply 20 may be provided with any conventional form of selectively detachable electrical connector.

With reference now to FIG. 3, an enlarged diagrammatic side view is provided, which illustrates the triangular configuration of the three tubes 12 on the frame tubes F of the bicycle. The power supply 20 is provided with a resilient clip 22 for engagement with the frame tube F of the bicycle in a location under the bicycle seat. As previously mentioned, the sequenced flashing of the LEDs 16 on each tube 12 provides a triangular warning signal which is in the form of the standard slow moving vehicle indicator.

In FIG. 4, a diagrammatic illustration is provided of the manner in which the clear plastic flexible tube 12 is positioned around a bicycle frame tube F. As shown, the flexible nature of the tube 12 allows the tube to be spread apart along the longitudinal slit 14. Each tube 12 is provided with two rows of longitudinally spaced LEDs 16, positioned on diametrically opposed sides of the tube 12. These flashing LEDs 16 thus provide enhanced broadside visibility of a bicycle to motorists on both sides of the bicycle.

In FIG. 5, a front end view of the tube 12 is provided.

In FIG. 6, a partial side view of the tube 12 is provided.

In FIG. 7, a transverse cross sectional view of the tube 12 depicts the LEDs 16 embedded at diametrically opposed locations in the side walls of the tube 12.

The longitudinal cross sectional view of FIG. 8 illustrates the longitudinal spacing of the embedded LEDs 16.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A bicycle lighting device for attachment to a bicycle having a frame formed from a plurality of interconnected frame tubes, said lighting device comprising:
    at least one elongated tube formed from a flexible transparent material;
    said elongated tube provided with a longitudinal slit extending along the entire length thereof forming a resilient frictional clamp dimensioned to be received around one of said bicycle frame tubes;
    said elongated tube provided with two rows of embedded longitudinally spaced light emitting diodes, said rows at diametrically opposed locations on said elongated tube;
    flashing sequencing means for intermittently flashing said light emitting diodes in sequence;
    power supply means for supplying electrical current; and
    electrical wiring means imbedded in said elongated tube interconnecting said light emitting diodes, said power supply means and said flashing sequencing means for providing motorists with a flashing signal.

2. A bicycle lighting device for attachment to a bicycle having a frame formed from a plurality of frame tubes interconnected in a triangular configuration, said lighting device comprising:
    three elongated tubes formed from a flexible transparent material;
    each of said elongated tubes provided with a longitudinal slit extending along the entire length thereof forming a resilient frictional clamp dimensioned to be received around one of said bicycle frame tubes, said elongated tubes adapted to be arranged in a generally triangular configuration on said triangular bicycle frame;
    each of said elongated tubes provided with two rows of embedded longitudinally spaced light emitting diodes, said rows at diametrically opposed locations on said elongated tubes;
    flashing sequencing means for intermittently flashing said light emitting diodes in sequence;
    power supply means for supplying electrical current; and
    electrical wiring means imbedded in said elongated tubes interconnecting said light emitting diodes, said power supply means and said flashing sequencing means for providing motorists with a broad side triangular flashing standard slow moving vehicle signal.

* * * * *